United States Patent
Smith (10) Patent No.: US 10,408,449 B2
(45) Date of Patent: Sep. 10, 2019

(54) DIRECT VENT DILUTION AIR CONNECTION SYSTEM

(71) Applicant: Regal Beloit America, Inc., Beloit, WI (US)

(72) Inventor: Michael D. Smith, Rogers, AR (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 0 days.

(21) Appl. No.: 15/830,567

(22) Filed: Dec. 4, 2017

(65) Prior Publication Data

US 2019/0170351 A1 Jun. 6, 2019

(51) Int. Cl.
| | |
|---|---|
| *F24H 9/00* | (2006.01) |
| *F23L 17/00* | (2006.01) |
| *F23L 17/16* | (2006.01) |
| *F23J 15/06* | (2006.01) |
| *B23P 19/04* | (2006.01) |

(52) U.S. Cl.
CPC ............ *F23L 17/005* (2013.01); *B23P 19/04* (2013.01); *F23J 15/06* (2013.01); *F23L 17/16* (2013.01); *F23J 2213/20* (2013.01)

(58) Field of Classification Search
CPC .... F22B 1/00; F22B 31/00; F24H 9/00; F24H 9/2085; F24H 3/105; F24H 1/22
See application file for complete search history.

(56) References Cited

U.S. PATENT DOCUMENTS

| | | | | |
|---|---|---|---|---|
| 4,380,215 A | * | 4/1983 | Mendelson | F24H 9/0026 122/155.2 |
| 5,197,415 A | * | 3/1993 | Stretch | F23C 3/004 122/14.22 |
| 6,398,512 B2 | * | 6/2002 | Stewart | F04D 25/082 417/53 |
| 6,622,660 B1 | * | 9/2003 | Bajic | F23L 17/005 122/13.01 |
| D491,259 S | * | 6/2004 | Garrison | D23/370 |
| 6,827,560 B2 | * | 12/2004 | Gatley, Jr. | F24H 9/02 417/423.14 |
| 7,354,244 B2 | * | 4/2008 | Hasbargen | F23L 17/005 415/212.1 |
| 8,079,834 B2 | * | 12/2011 | Gatley, Jr. | F24H 9/02 417/423.14 |
| 8,616,158 B2 | * | 12/2013 | Garrett | F04D 29/601 122/18.31 |

(Continued)

FOREIGN PATENT DOCUMENTS

CA   2521936 C  *  8/2008  ............ F24H 1/205

*Primary Examiner* — Gregory A Wilson (74) *Attorney, Agent, or Firm* — Thompson Coburn LLP (57) ABSTRACT

A blower systems includes a blower housing, a gasket, and a clamp. The blower housing includes a dilution air inlet port having a tubular portion with an end margin having a plurality of flanges separated by slits enabling flexing of the plurality of flanges to resiliently move radially inwardly from an unflexed position. The gasket extends within the end margin of the dilution air inlet port. The air supply system includes an inlet portion, a combustion air portion, and a one-piece fitting having an inlet, dilution air outlet, and a combustion air outlet. The clamp is positioned radially about the plurality of flanges such that it can secure a source of dilution air within the dilution air inlet port.

20 Claims, 6 Drawing Sheets

(56) References Cited

U.S. PATENT DOCUMENTS

| | | | |
|---|---|---|---|
| 8,881,688 B2* | 11/2014 | English | F24H 9/0031 |
| | | | 122/18.31 |
| 10,024,574 B2* | 7/2018 | Lesage | F24H 8/00 |
| 2005/0058560 A1* | 3/2005 | Gatley, Jr. | F04D 25/06 |
| | | | 417/423.14 |
| 2009/0084328 A1* | 4/2009 | Lyons | F23C 7/02 |
| | | | 122/13.01 |
| 2013/0019816 A1* | 1/2013 | Lesage | F24H 1/205 |
| | | | 122/18.31 |

* cited by examiner

DIRECT VENT DILUTION AIR CONNECTION SYSTEM

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND

Field

This disclosure relates generally to direct vent blower systems, and more particularly, to blower systems for direct connection to a vent.

SUMMARY

One aspect of the disclosure relates to a direct vent blower system for use with a gas-fueled heater having a burner. The blower systems includes a blower housing, a gasket, and a clamp. The blower housing includes a first blower housing piece and a second blower housing piece. The first and second blower housing pieces are adapted and configured to be connected to one another in a manner to collectively surround a blower fan, and the first housing piece includes a dilution air inlet port. The blower housing further includes a combustion products inlet port and an exhaust port. The combustion products inlet port is configured to receive combustion products from the burner of the gas-fueled heater, and the exhaust port is configured to discharge from the blower housing a mixture of dilution air and combustion products. The dilution air inlet port includes a tubular portion having an end margin having a plurality of flanges separated by slits extending axially along the end margin. The slits enable the plurality of flanges to resiliently move radially inwardly from an unflexed position. At least some of the flanges of the tubular portion are a portion of the first blower housing piece. The first blower housing piece is a molded one-piece member. The gasket extends within the end margin of the dilution air inlet port. The clamp is positioned radially about the plurality of flanges and engaged such that one or more of the plurality of flanges is flexed radially inward from the unflexed position such that the dilution air outlet of the one-piece fitting is secured within the dilution air inlet port of the first blower housing piece.

Another aspect of the disclosure relates to a direct vent blower system for use with a gas-fueled heater having a burner. The blower system includes a blower housing, a gasket, an air supply system, and a clamp. The blower housing includes a first blower housing piece and a second blower housing piece. The first and second blower housing pieces are adapted and configured to be connected to one another in a manner to collectively surround a blower fan. The first housing piece includes a dilution air inlet port, and the blower housing further includes a combustion products inlet port and an exhaust port. The combustion products inlet port is configured to receive combustion products from the burner of the gas-fueled heater. The exhaust port is configured to discharge from the blower housing a mixture of dilution air and combustion products. The dilution air inlet port includes a tubular portion having an end margin having a plurality of flanges separated by slits extending axially along the end margin. The slits enable at least one of the plurality of flanges to resiliently move radially inwardly from an at rest position. The first blower housing piece being a molded one-piece member. The gasket extends within the end margin of the dilution air inlet port. The air supply system includes an inlet portion, a combustion air portion, a connection fitting, and a one-piece fitting. The one-piece fitting includes an inlet, dilution air outlet, and a combustion air outlet. The inlet portion of the air supply system is in fluid communication with the inlet of the one-piece fitting. The combustion air portion of the air supply system is in fluid communication with the combustion air outlet of the one-piece fitting and is configured to provide combustion air to the burner of the gas-fueled heater. The dilution air outlet of the one-piece fitting is in fluid communication with the connection fitting. The connection fitting is adhered to the dilution air outlet of the one-piece fitting, and the connection fitting is made of a material other than rubber. The connection fitting is positioned at least partially within the gasket and the end margin of the dilution air inlet port of the first blower housing piece such that the dilution air outlet of the one-piece fitting is in fluid communication with the dilution air inlet port of the blower housing. The clamp is positioned radially about the plurality of flanges and engaged such that one or more of the plurality of flanges is moved radially inward from an at rest position such that the connection fitting is secured within the dilution air inlet port of the first blower housing piece.

Another aspect of the disclosure relates to a method for installing a direct vent blower system for use with a gas-fueled heater having a burner. The method includes positioning a gasket at least partially within a blower housing. The blower housing includes a first blower housing piece and a second blower housing piece. The first and second blower housing pieces are adapted and configured to be connected to one another in a manner to collectively surround a blower fan. The first housing piece includes a dilution air inlet port, a combustion products inlet port and an exhaust port. The combustion products inlet port is configured to receive combustion products from the burner of the gas-fueled heater. The exhaust port is configured to discharge from the blower housing a mixture of dilution air and combustion products. The dilution air inlet port includes a tubular portion having an end margin with a plurality of flanges separated by slits extending axially along the end margin. The slits enable at least one of the plurality of flanges to resiliently move radially inwardly from an at rest position. The first blower housing piece is a molded one-piece member, and the gasket is positioned within the end margin of the dilution air inlet port. The method further includes coupling an air supply system to the blower housing. The air supply system includes an inlet portion, a combustion air portion, and a one-piece fitting. The one-piece fitting includes an inlet, dilution air outlet, and a combustion air outlet. The inlet portion of the air supply system is in fluid communication with the inlet of the one-piece fitting. The combustion air portion of the air supply system is in fluid communication with the combustion air outlet of the one-piece fitting and is configured to provide combustion air to the burner of the gas-fueled heater. The dilution air outlet of the one-piece fitting is positioned at least partially within the gasket and the end margin of the dilution air inlet port of the first blower housing piece such that the dilution air outlet of the one-piece fitting is in fluid communication with the dilution air inlet port of the blower housing. The method further includes positioning a clamp radially about the plurality of flanges and tightening the clamp such that the clamp engages the one or more of the plurality of flanges and moves one or more of the plurality of flanges radially inward from the at rest position. As a result, the dilution air outlet of the one-piece fitting is secured within the dilution air inlet port of the first blower housing piece.

Further features and advantages of the present disclosure, as well as the structure and operation of various embodiments of the present disclosure, are described in detail below with reference to the accompanying drawings.

BRIEF DESCRIPTION OF THE DRAWINGS

The accompanying drawings, which are incorporated in and form a part of the specification, illustrate the embodiments of the present disclosure and together with the description, serve to explain the principles of the disclosure. In the drawings.

DETAILED DESCRIPTION

FIGS. 1 through 5 depict a gas-fueled heater 50 (e.g., a water heater) and a blower system 60 for use with the gas-fueled heater 50. The blower system 60 is a direct vent blower type system. For example, and without limitation, a single inlet pipe supplies both dilution to a blower and combustion air to a burner of the gas-fueled heater 50. The blower system 60 includes a blower housing 62, gasket 64, air supply system 66, and a clamp 68. The blower housing 62 is configured such that the blower housing 62 is connected to the air supply system 66 without using a rubber fitting and using only a single clamp 68. This provides several advantages including simplified installation, reduction in parts, and a more compact system in which the air supply system 66 is positioned closer to the gas fueled heater 50 than in comparison to other installations (e.g., when a rubber fitting is used to connect the blower housing 62 to the air supply system 66).

The blower housing 62 includes a first blower housing piece 70 and a second blower housing piece 72. The first 70 and second blower housing pieces 72 are adapted and configured to be connected to one another in a manner to collectively surround a blower fan 74. The first housing piece 70 includes a dilution air inlet port 76. The blower housing 62 further comprises a combustion products inlet port 78 and an exhaust port 80. The combustion products inlet port 78 is configured to receive combustion products from the burner of the gas-fueled heater 50. For example, and without limitation, the combustion products inlet port 78 is in fluid communication with a flue outlet 82 of the gas-fueled heater 50. The exhaust port 80 is configured to discharge from the blower housing 62 a mixture of dilution air and combustion products. The dilution air is received through the dilution air inlet port 76, the combustion products are received through the combustion products inlet port 78, and the two are mixed prior to passing through the fan 74.

The dilution air inlet port 76 of the blower housing 62 includes a tubular portion 84. The tubular portion 84 has an end margin 86. The end margin 86 includes a plurality of flanges 88 separated by slits 90 extending axially along the end margin 86. The flanges 88 extend axially along the end margin 86 and generally continue the shape of the tubular portion 84. The slits 90 enable at least one of the plurality of flanges 88 (and preferably all of the flanges) to resiliently flex radially inwardly from an unflexed position (e.g., an at rest position). When moved inward from the at rest position (e.g., flexed), the plurality of flanges 88 reduce the inner diameter of the end margin 86. This allows the dilution air inlet port 76 to secure a fitting within the end margin 86.

The first blower housing piece 70 is a molded one piece member. The dilution air inlet port 76 comprises two or more separate parts and is not included as a portion of a single one-piece member (e.g., first blower housing piece 70). For example, and without limitation, a first portion of the dilution air inlet port 76 (e.g., two of four flanges 88) is formed by the first blower housing piece 70 and a second portion of the dilution air inlet port 76 (e.g., two other flanges 88) is formed by the second blower housing piece 72. In other words, at least some of the flanges 88 of the dilution air inlet port 76 are a portion of the first blower housing piece 70, with the first blower housing piece 70 being of one-piece construction. The remainder of the flanges 88 included in the air inlet port 76 are a portion of a component other than the first blower housing piece 70 such as the second blower housing piece 72. In alternative embodiments, the first blower housing piece 70 is a molded one-piece member and includes the dilution air inlet port 76. In other words, all of the flanges 88 form a portion of the first blower housing piece 70, with the first blower housing piece 70 being of one-piece construction.

The air supply system 66 provides dilution air to the blower housing 62 and combustion air to the gas-fueled heater 50. The air supply system 66 includes an inlet portion 92, a combustion air portion 94, and a one-piece fitting 96. The one-piece fitting 96 comprising an inlet 98, dilution air outlet 100, and a combustion air outlet 102. The inlet portion 92 of the air supply system 66 is in fluid communication with the inlet 98 of the one-piece fitting 96. For example, and without limitation, the inlet 98 may include a portion adapted and configured to receive the inlet portion 92 of the air supply system 66. The two may be adhered to one another using a suitable adhesive. The combustion air portion 94 of the air supply system 66 is in fluid communication with the combustion air outlet 102 of the one-piece fitting 96. For example, and without limitation, the combustion air outlet 102 may include a portion adapted and configured to receive the combustion air portion 94 of the air supply system 66. The two may be adhered to one another using a suitable adhesive. The combustion air outlet 102 and combustion air portion 94 are configured to provide combustion air to a burner of the gas-fueled heater 50. The dilution air outlet 102 is in fluid communication with the end margin 86 of the tubular portion 84 of the blower housing 62 such that dilution air is provided by the air supply system 66 to the blower housing 62.

In some embodiments, the air supply system 66 further includes a connection fitting 104 that connects the dilution air outlet 100 of the one-piece fitting 96 to the tubular portion 84 of the blower housing 62. The dilution air outlet 100 of the one-piece fitting 96 is in fluid communication with the connection fitting 104. The connection fitting 104 may be adhered to the dilution air outlet 100 of the one-piece fitting 96. For example, and without limitation, the connection fitting 104 is adhered to the dilution air outlet 100 using an adhesive. In some embodiments, adhering the connection fitting 104 to the dilution air outlet 100 creates an integrated one-piece fitting 96 including the connection fitting 104.

The connection fitting 104 is comprised of a material other than rubber such that the connection fitting is rigid (e.g., more rigid than a flexible rubber fitting). In some embodiments, the connection fitting 104 is comprised of polyvinylchloride. The connection fitting 104 is positioned at least partially within the gasket 64 and the end margin 86 of the dilution air inlet port 84 of the first blower housing piece 70. This places the dilution air outlet 100 of the one-piece fitting 96 in fluid communication with the dilution air inlet port 76 of the blower housing 62. The connection fitting 104 is not adhered to the dilution air inlet port 76 of the blower housing 62 (e.g., including the first blower housing piece 70).

The clamp 68 is positioned radially about the plurality of flanges 88 of the end margin 86 of the dilution air inlet port 76. The clamp 68 may be tightened such that the clamp 68 engages one or more of the plurality of flanges 88 and moves one or more of the flanges 88 radially inward from an at rest position. As a result, the connection fitting 104 is secured within the dilution air inlet port 76. In some embodiments, only one clamp 68 secures the connection fitting 104 within the blower system 60. The blower system 60 does not include more than the one clamp 68.

Figure 1:
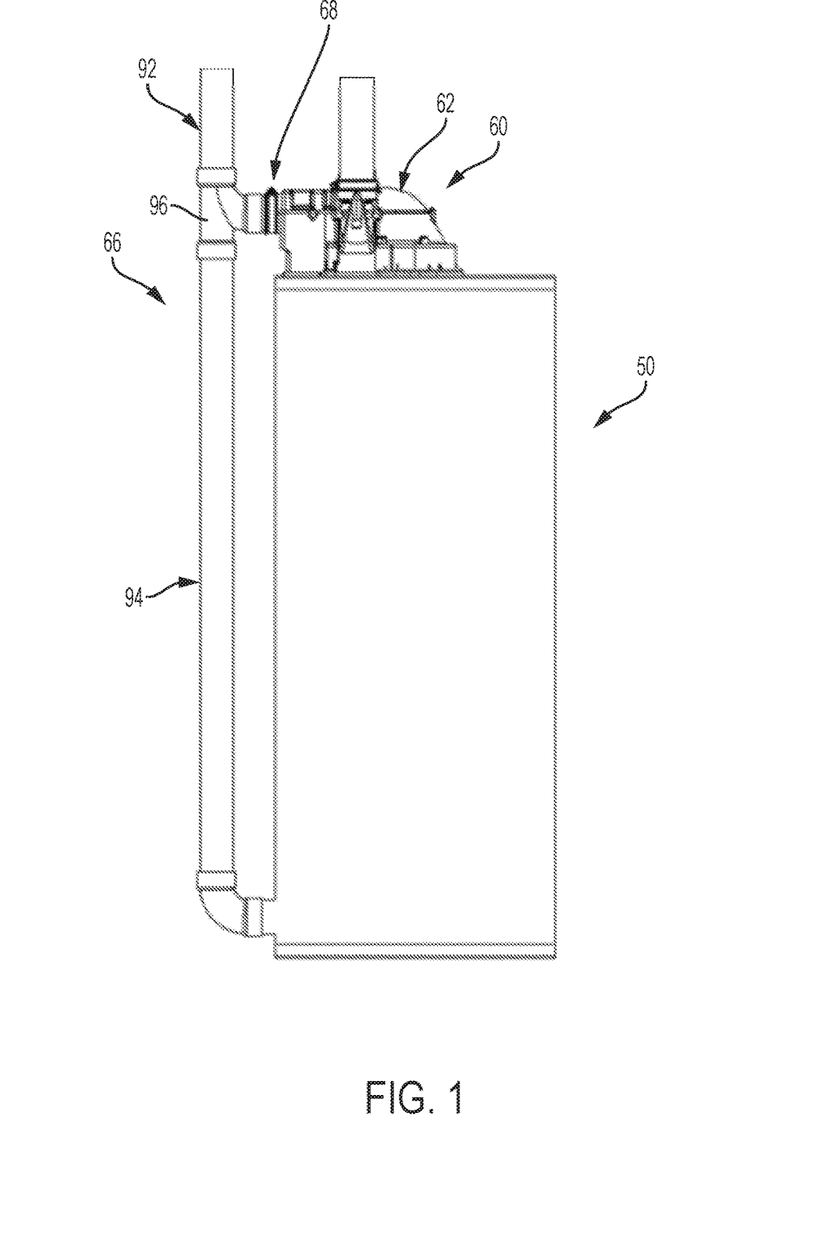
FIG. 1 is a side view of a direct vent blower system for use with a gas-fueled heater.
Figure 2:
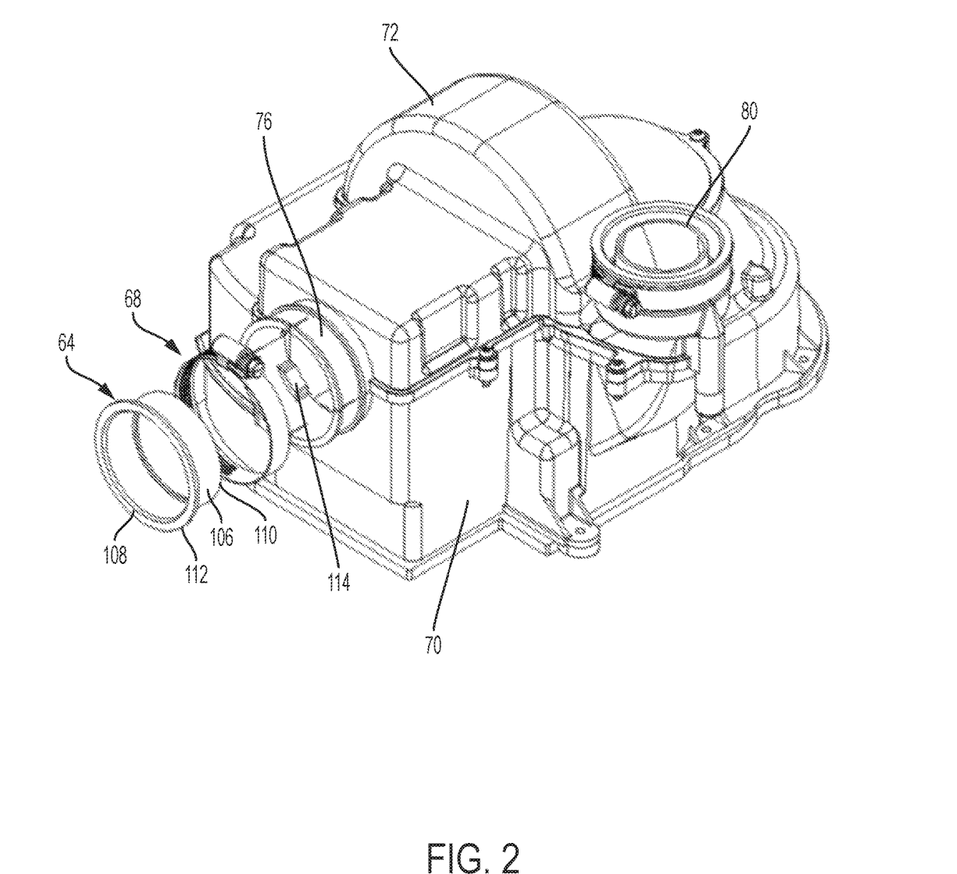
FIG. 2 is a perspective exploded view of the blower system shown in FIG. 1 depicting a blower housing, gasket, and clamp.
Figure 3:
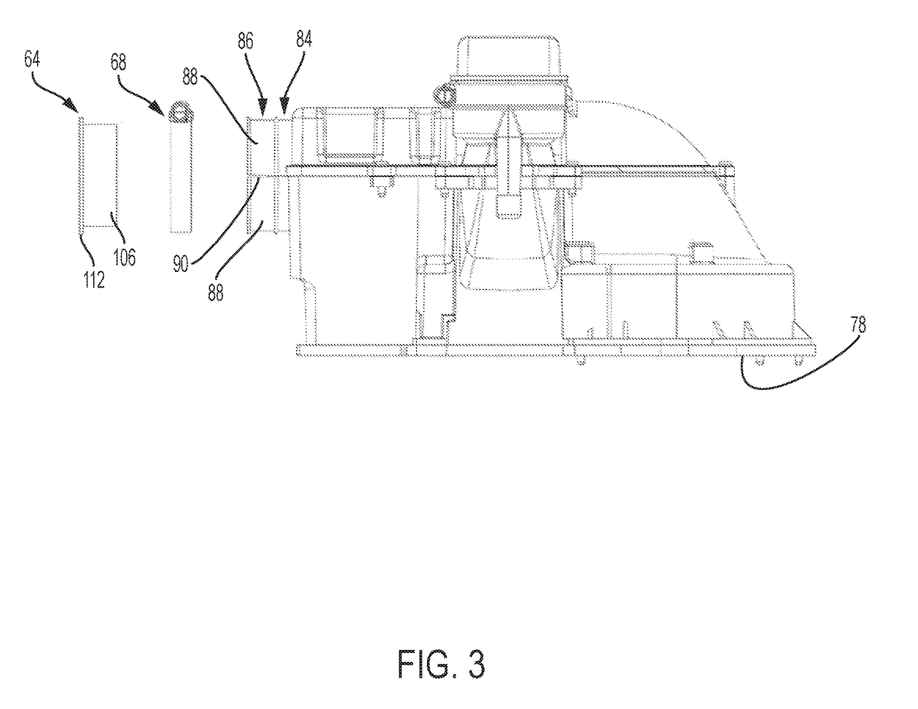
FIG. 3 is a side exploded view of the blower system shown in FIG. 2.
Figure 4:
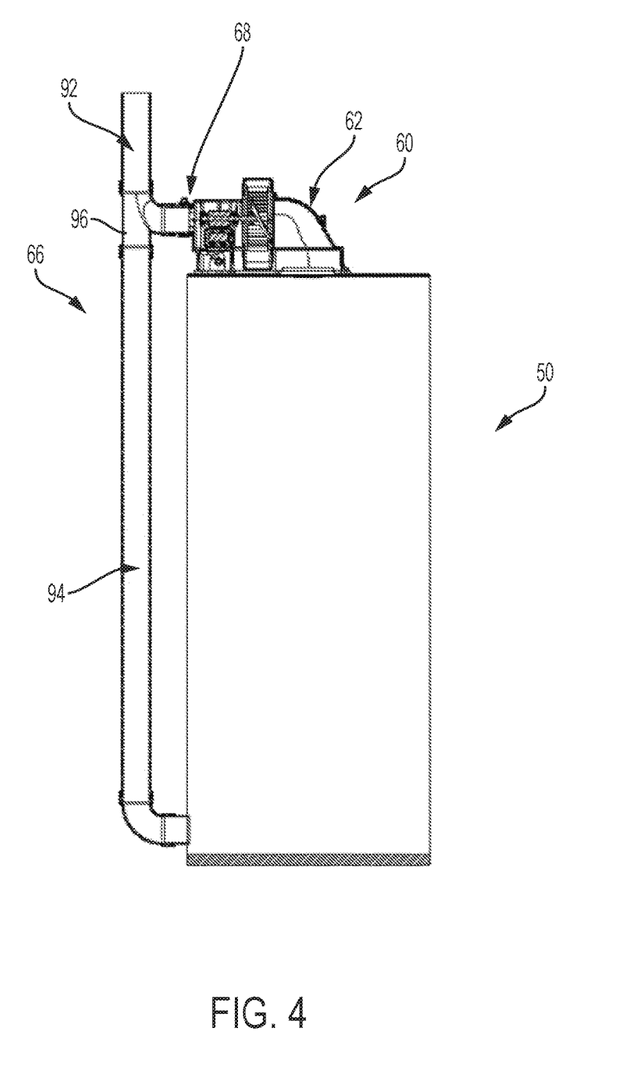
FIG. 4 is side view of the blower system and gas-fueled heater shown in FIG. 1 with portions broken away to show details.
Figure 5:
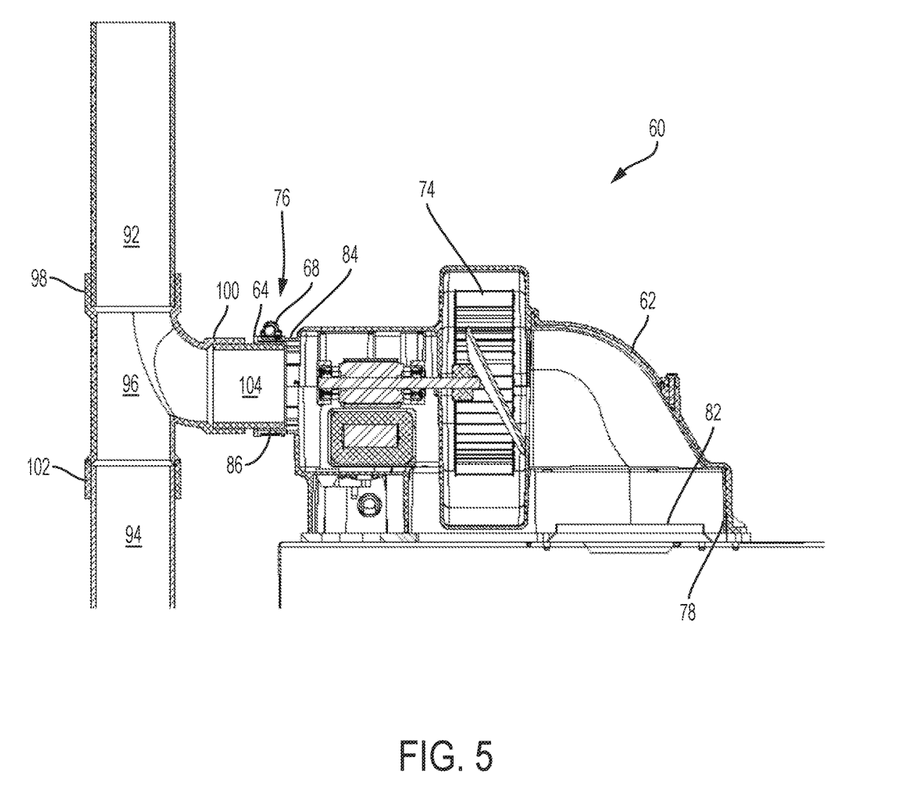
FIG. 5 is a detail view of a portion of the blower system and gas-fueled heater shown in FIG. 4.

The gasket 64 is placed between the air supply system 66 (e.g., the connection fitting 104 or one-piece fitting 96) and the tubular portion 84 of the blower housing 62. The gasket 64, when inserted into the blower housing 62, extends within the end margin 86 of the dilution air inlet port 76 (e.g., as depicted in FIG. 5). This configuration allows the gasket 64 to form a seal between the blower housing 62 and the air supply system 66. For example, and without limitation, the gasket 64 may include a cylindrical portion 106 extending axially between a first end portion 108 and a second end portion 110. The gasket 64 also includes a radial flange 112 extending radially from the first end portion 108. The cylindrical portion 106 is positionable within the end margin 86 of the dilution air inlet port 76. The radial flange 112 has an outer diameter greater than that of the end margin 86 of the dilution air inlet 76. In some embodiments, the dilution air inlet port 76 includes at least one stop 114 extending radially inward. The stop 114 is adapted and configured to engage with the cylindrical portion 106 of the gasket 64 to prevent over insertion of the gasket 64 into the dilution air inlet port 76.

Figure 6:
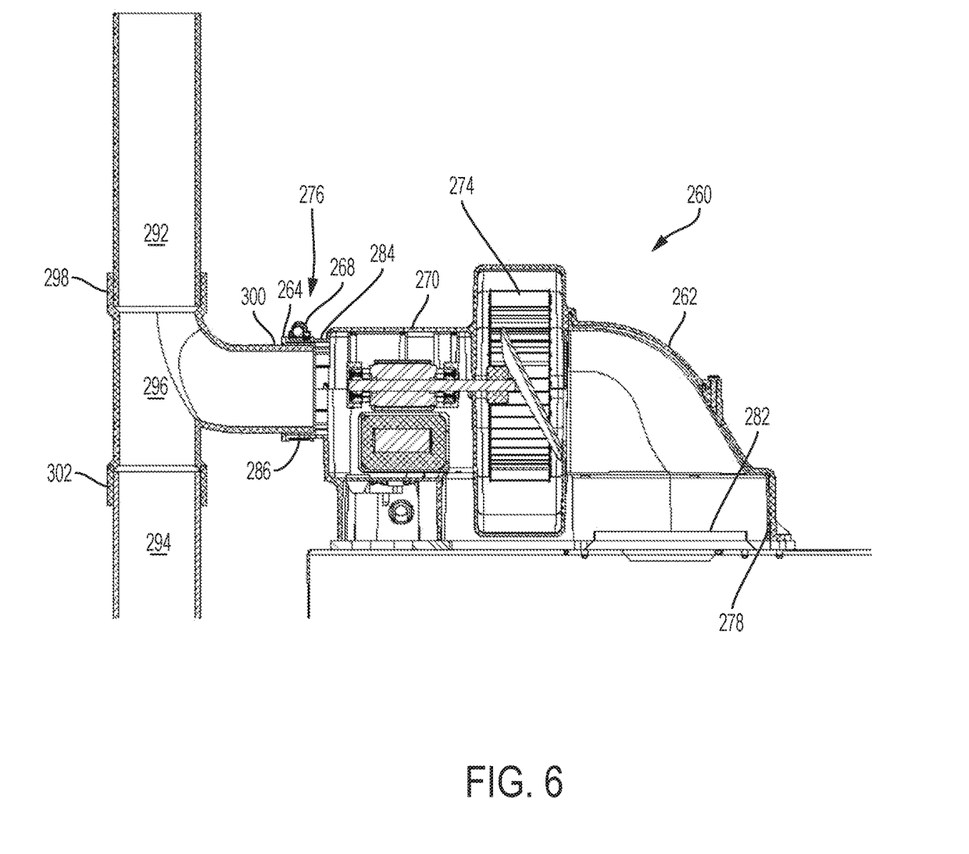
FIG. 6 is a detail view of a portion of an alternative blower system for use with a gas-fueled heater.

FIG. 6 depicts an alternative embodiment of blower system 60. This embodiment is similar to the one depicted in FIGS. 1-5 with like part numbers generally indicating similar parts in structure and/or function (e.g., blower housing 62 is the same as blower housing 262 and dilution air outlet 100 is similar to dilution air outlet 300). In this embodiment, the blower system 260 does not include a connection fitting. Rather, the one piece fitting 296 is connected directly to the end margin 286 of the dilution air inlet port 276. The dilution air outlet 300 of the one-piece fitting 296 is positioned at least partially within the gasket 264 and the end margin 286 of the dilution air inlet port 276 of the first blower housing piece 270. This places the dilution air outlet 300 of the one-piece fitting 296 in fluid communication with the dilution air inlet port 276 of the blower housing 262.

The clamp 268 is positioned radially about the plurality of flanges 288. The clamp 268 engages the plurality of flanges 288 such that one or more of the plurality of flanges 288 is moved radially inward from an at rest position such that the dilution air outlet 300 of the one-piece fitting 296 is secured within the dilution air inlet port 276 of the first blower housing piece 270. In some embodiments, only the single clamp 268 secures the one piece fitting within the blower system 260. No other clamps are used. Also, the dilution air outlet 300 of the one-piece fitting 296 is not adhered to the dilution air inlet port 276. For example, and without limitation, the one-piece fitting 296 is a street type fitting such that the dilution air outlet 300 fits within the dilution air inlet 276 of the blower housing 262. As a street type fitting, the one-piece fitting 296 has a dilution air outlet 300 with a first maximum outer diameter, has an inlet 298 with a second maximum outer diameter, and has a combustion air outlet 302 with a third maximum outer diameter. The first maximum outer diameter (of the dilution air outlet 300) being less than both the second and third maximum outer diameters.

In view of the foregoing, it will be seen that the several advantages of the disclosure are achieved and attained.

The embodiments were chosen and described in order to best explain the principles of the disclosure and its practical application to thereby enable others skilled in the art to best utilize the disclosure in various embodiments and with various modifications as are suited to the particular use contemplated.

As various modifications could be made in the constructions and methods herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above-described exemplary embodiments, but should be defined only in accordance with the following claims appended hereto and their equivalents.

What is claimed is:

1. A direct vent blower system for use with a gas-fueled heater having a burner, the blower system comprising:
    a blower housing comprising a first blower housing piece and a second blower housing piece, the first and second blower housing pieces being adapted and configured to be connected to one another in a manner to collectively surround a blower fan, the first housing piece comprising a dilution air inlet port, the blower housing further comprising a combustion products inlet port and an exhaust port, the combustion products inlet port being configured to receive combustion products from the burner of the gas-fueled heater, the exhaust port being configured to discharge from the blower housing a mixture of dilution air and combustion products, the dilution air inlet port comprising a tubular portion having an end margin comprising a plurality of flanges separated by slits extending axially along the end margin, the slits being configured to enable flexing of the plurality of flanges from an unflexed position, at least some of the flanges of the tubular portion being a portion of the first blower housing piece, the first blower housing piece being a molded one-piece member;

a gasket extending within the end margin of the dilution air inlet port; and a clamp positioned radially about the plurality of flanges and engageable such that one or more of the plurality of flanges is moveable radially inward from the unflexed position.

2. A blower system in accordance with claim 1 further comprising an air supply system comprising an inlet portion, a combustion air portion, and a one-piece fitting, the one-piece fitting comprising an inlet, dilution air outlet, and a combustion air outlet, the inlet portion of the air supply system being in fluid communication with the inlet of the one-piece fitting, the combustion air portion of the air supply system being in fluid communication with the combustion air outlet of the one-piece fitting and configured to provide combustion air to the burner of the gas-fueled heater, the dilution air outlet of the one-piece fitting being positioned at least partially within the gasket and the end margin of the dilution air inlet port of the first blower housing piece such that the dilution air outlet of the one-piece fitting is in fluid communication with the dilution air inlet port of the blower housing.

3. A blower system in accordance with claim 2 wherein only one clamp secures the one-piece fitting within the blower system.

4. A blower system in accordance with claim 2 wherein the dilution air outlet of the one-piece fitting is not adhered to the dilution air inlet port of the first blower housing piece.

5. A blower system in accordance with claim 2 wherein the one-piece fitting is a street type fitting wherein the dilution air outlet has a first maximum outer diameter, the inlet has a second maximum outer diameter, and the combustion air outlet has a third maximum outer diameter, the first maximum outer diameter being less than both the second and third maximum outer diameters.

6. A blower system in accordance with claim 1 wherein the gasket includes a cylindrical portion extending axially between a first end portion and a second end portion, and a radial flange extending radially from the first end portion, the cylindrical portion positionable within the end margin of the dilution air inlet port, the radial flange having an outer diameter greater than that of the end margin of the of the dilution air inlet.

7. A blower system in accordance with claim 6 wherein the dilution air inlet port includes at least one stop extending radially inward, the stop adapted and configured to engage with the cylindrical portion of the gasket to prevent over insertion of the gasket into the dilution air inlet port.

8. A blower system in accordance with claim 1 further comprising an air supply system comprising an inlet portion, a combustion air portion, a connection fitting, and a one-piece fitting, the one-piece fitting comprising an inlet, dilution air outlet, and a combustion air outlet, the inlet portion of the air supply system being in fluid communication with the inlet of the one-piece fitting, the combustion air portion of the air supply system being in fluid communication with the combustion air outlet of the one-piece fitting and configured to provide combustion air to the burner of the gas-fueled heater, the dilution air outlet of the one-piece fitting being in fluid communication with the connection fitting, the connection fitting being adhered to the dilution air outlet of the one-piece fitting, the connection fitting being comprised of a material other than rubber, and the connection fitting positioned at least partially within the gasket and the end margin of the dilution air inlet port of the first blower housing piece such that the dilution air outlet of the one-piece fitting is in fluid communication with the dilution air inlet port of the blower housing.

9. A blower assembly in accordance with claim 8 wherein the connection fitting is comprised of polyvinylchloride.

10. A blower system in accordance with claim 8 wherein only one clamp secures the connection fitting within the blower system.

11. A blower system in accordance with claim 8 wherein the connection fitting is not adhered to the dilution air inlet port of the first blower housing piece.

12. A blower system in accordance with claim 8 wherein the gasket includes a cylindrical portion extending axially between a first end portion and a second end portion, and a radial flange extending radially from the first end portion, the cylindrical portion positionable within the end margin of the dilution air inlet port, the radial flange having an outer diameter greater than that of the end margin of the of the dilution air inlet.

13. A blower system in accordance with claim 12 wherein the dilution air inlet port includes at least one stop extending radially inward, the stop adapted and configured to engage with the cylindrical portion of the gasket to prevent over insertion of the gasket into the dilution air inlet port.

14. A method for installing a direct vent blower system for use with a gas-fueled heater having a burner, the method comprising:

positioning a gasket at least partially within a blower housing, the blower housing comprising a first blower housing piece and a second blower housing piece, the first and second blower housing pieces being adapted and configured to be connected to one another in a manner to collectively surround a blower fan, the first housing piece comprising a dilution air inlet port, the blower housing further comprising a combustion products inlet port and an exhaust port, the combustion products inlet port being configured to receive combustion products from the burner of the gas-fueled heater, the exhaust port being configured to discharge from the blower housing a mixture of dilution air and combustion products, the dilution air inlet port comprising a tubular portion having an end margin comprising a plurality of flanges separated by slits extending axially along the end margin, the slits enabling flexing of the plurality of flanges from an unflexed position, at least some of the plurality of flanges being a portion of the first blower housing piece, the first blower housing piece being a molded one-piece member, the gasket being positioned within the end margin of the dilution air inlet port;

coupling an air supply system to the blower housing, the air supply system comprising an inlet portion, a combustion air portion, and a one-piece fitting, the one-piece fitting comprising an inlet, dilution air outlet, and a combustion air outlet, the inlet portion of the air supply system being in fluid communication with the inlet of the one-piece fitting, the combustion air portion of the air supply system being in fluid communication with the combustion air outlet of the one-piece fitting and configured to provide combustion air to the burner of the gas-fueled heater, the dilution air outlet of the one-piece fitting being positioned at least partially within the gasket and the end margin of the dilution air inlet port of the first blower housing piece such that the dilution air outlet of the one-piece fitting is in fluid communication with the dilution air inlet port of the blower housing;

positioning a clamp radially about the plurality of flanges; and tightening the clamp such that the clamp engages the one or more of the plurality of flanges and moves one or more of the plurality of flanges radially inward from the unflexed position such that the dilution air outlet of the one-piece fitting is secured within the dilution air inlet port of the first blower housing piece.

15. A method in accordance with claim 14 further comprising forming the one-piece fitting by adhering a first component to a second component, the first component forming the inlet and the combustion air outlet, the second component forming the dilution air outlet.

16. A method in accordance with claim 15 wherein the second component is comprised of a material other than rubber.

17. A method in accordance with claim 15 wherein the second component is comprised of polyvinylchloride.

18. A method in accordance with claim 14 wherein the one-piece fitting is not adhered to the dilution air inlet port of the first blower housing piece.

19. A method in accordance with claim 14 wherein the gasket includes a cylindrical portion extending axially between a first end portion and a second end portion, and a radial flange extending radially from the first end portion, the cylindrical portion positionable within the end margin of the dilution air inlet port, the radial flange having an outer diameter greater than that of the end margin of the of the dilution air inlet.

20. A method in accordance with claim 19 wherein the dilution air inlet port includes at least one stop extending radially inward, the stop adapted and configured to engage with the cylindrical portion of the gasket to prevent over insertion of the gasket into the dilution air inlet port.

* * * * *